Jan. 2, 1951 C. L. WILLARD ET AL Re. 23,320

FEED HELIX

Original Filed Sept. 2, 1947 2 Sheets-Sheet 1

INVENTORS
CARL L. WILLARD
J. JACK WILLARD
BY Fulwider & Mattingly
Attorneys

FEED HELIX

Original Filed Sept. 2, 1947 2 Sheets-Sheet 2

INVENTORS
CARL L. WILLARD
BY J. JACK WILLARD
Fulwider & Mattingly
Attorneys

Reissued Jan. 2, 1951 Re. 23,320

UNITED STATES PATENT OFFICE 23,320

FEED HELIX

Carl L. Willard and J Jack Willard,
Lynwood, Calif.

Original No. 2,492,249, dated December 27, 1949, Serial No. 771,646, September 2, 1947. Application for reissue July 21, 1950, Serial No. 175,223

7 Claims. (Cl. 259—161)

Matter enclosed in heavy brackets [ ] appears in the original patent but forms no part of this reissue specification; matter printed in italics indicates the additions made by reissue

This invention relates to mixing drums and more particularly to the means within such drums for feeding material into or discharging material from the same.

*A major object of the invention is to provide a mixer having a drum mounted on a rotary axis of fixed inclination and of such construction and design that material in the drum may be mixed by rotating the drum in one direction and said material may be discharged from the drum without tilting the same by merely counterrotating the drum.*

[An] *Another* object of the present invention is to provide a drum of the character indicated and embodying material-feeding means, that is designed to obviate clogging of said drum particularly when the same receives material, such as aggregate.

For discharging cement or concrete, a mixing drum is conventionally provided with one or more helices which urge such mixtures outwardly while said drum is being rotated. The hand of these helices is in accordance with the direction of rotation of the drum. However, for feeding aggregate into the drum to become a cement or concrete mixture, the hand of the helices remains the same but the drum rotation is reversed, and in practice it is found that such aggregate does not readily feed into the drum heretofore used as rapidly as desired without the opening thereof becoming clogged.

Accordingly, *still* another object of the invention is to provide efficient discharge means, in a mixing drum which also effects rapid feed or intake of materials to obviate clogging of the drum opening.

Our invention also has for its objects to provide such means that are positive in operation, convenient in use, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration of example only.

In the drawings, like reference characters designate similar parts in the several views.

Figure 1:
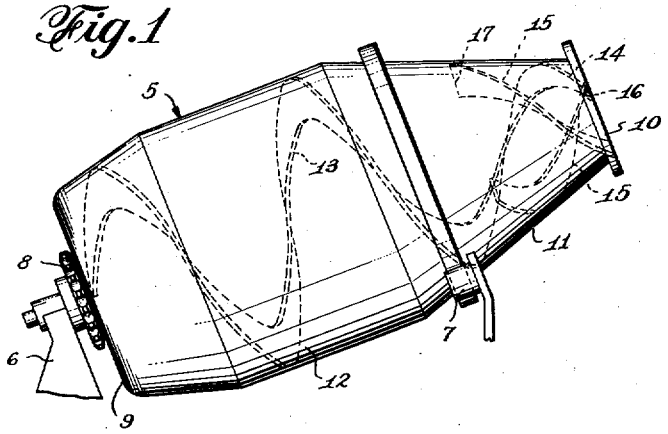
Fig. 1 is a side elevational view of a mixing drum embodying features of the present invention.
Figure 3:
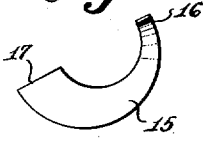
Fig. 3 is a detail view of a helical section employed in the construction.
Figure 2:
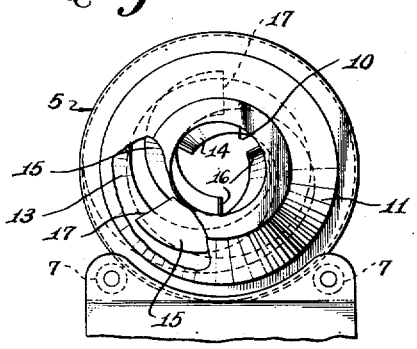
Fig. 2 is a partly broken end view as seen from the right of Fig. 1.

The present invention is an improvement of the invention disclosed in our application entitled "Portable concrete mixer," Ser. No. 672,364, and filed May 27, 1946, now abandoned. Reference is made to said application for the general environment of the mixing drum shown in the accompanying drawing. In said drawing, a drum 5 is supported at one end in a bearing 6 and at the other by rollers 7 for rotation about its axis by a drive to a sprocket wheel 8. Said drum is preferably mounted so that its closed end 9 is lower than the opening 10 thereof at the other end and is thereby supported at an angle to the horizontal. *The bearing 6 and the rollers 7 may be fixed in their relative positions since it is unnecessary to tilt the drum to discharge the same, such discharge being accomplished by counterrotation, as will hereinafter be described.* No matter how otherwise formed, the drum, at the open end 10, is conically formed as at 11 being smallest at said open end which is, therefore, generally restricted in size with respect to the drum body 12.

Assuming the drum to have clockwise rotation, the same is provided with a feed helix 13 that extends for at least 360° and preferably more and is formed to be right-handed and, therefore, efficiently serves, during clockwise rotation of the drum, to urge a mixture therein outwardly through opening 10. For a counter-clockwise rotating drum, the helix should be of the other hand.

When the drum is to receive aggregate through its opening 10, it is rotated in the opposite direction and said helix will draw said aggregate into the drum. However, because of the dry nature of the materials comprising the aggregate, the openings in the drums heretofore in use, in practice become clogged since the helix is insufficient to draw the aggregate inward at a rapid enough rate. Further, the end of the helix in such a drum, adjacent said opening, acts to divert some of the material to fall outside of the drum.

According to our invention, to obviate the above faults, the helix 13, at its end *portion* 14 as it approaches opening 10, is gradually reduced in width. This reduction of the end *portion* of the feed helix serves to eliminate the fault of diverting material as stated above. In order to increase the capacity of the drum to receive dry aggregate *during the loading operation*, one or more *relatively short*, helical sections 15, similar in form and design *and substantially equal in length* to the helix end *portion* 14, is provided in symmetrical arrangement to provide a plurality of feed elements serving to draw material rapidly into the drum. Each section 15 is formed with a relatively narrow end 16 adjacent to opening 10 so that the same is not blocked thereby, and with a gradually widened portion terminating at 17 at an intermediate point of conical drum part 11.

*It has been found that the efficiency of the single full width blade portion 13 as a mixing means in the drum body 12 is decidedly superior to that of a number of blades of less width. This for the reason that the relatively wide blade agitates and turns over substantially the entire body of material being mixed, whereas the narrow blades have a tendency to permit the body of material to remain substantially stationary, agitating only the portion immediately adjacent the walls of the drum. Also the mixer is much less expensive to construct if only a single full length blade is used in the body 12, instead of a number of full length blades. Thus, the intermediate blades 15 are confined in length to that portion of the drum where they are required, to-wit, the reduced end portion 11 adjacent the open end 10.*

Figure 4:
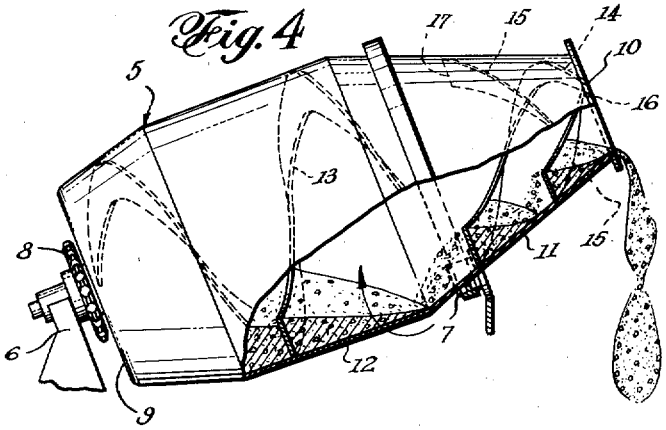
*Fig. 4 is an elevational partially sectioned view showing the unloading operation.*

It will be noted that by our present arrangement the overflow of the narrow portion of one helix, during discharge of aggregate is caught by the next helix following. Each of our helices tapers down in width to about one-half (½) of the wider end of same, the narrower width being at the opening of the drum. For loading, the reduced ends of our helices leaves a larger clear opening for the stream of aggregate to enter and to fall far back into the mixer drum and not on to the ground, and still the speed of discharge is not reduced. Since the reduced ends 14 and 16 of the helices 13 and 15, *in the embodiment illustrated,* are about one-half the width of the wider inner ends, the same each has a proportionally smaller capacity to convey material outward of the drum. However, *in the form shown,* the sum of the widths of said narrow ends is equal to or greater than the width of the inner portion of helix 13. Consequently, during discharge, the aggregate [brought] *screw-fed* by helix 13 toward opening 10 will, in part, fall from the narrowing end 14 because of the reduced width thereof. Ordinarily, such dislodgement of aggregate would fall back into the drum and the discharge capacity would be materially reduced. *As shown in Fig. 4, however, the* [The] helical sections 15, in this construction, catch such spillage and feed the same outward. It will be seen then that the reduced ends 14 and 16 have a discharge capacity at least equal to the feed capacity of the wider or main portion of helix 13.

While we have illustrated and described what we now regard as the preferred embodiment of our invention, the construction is, of course, subject to modifications without departing from the spirit and scope of our invention. We therefore, do not wish to restrict ourselves to our particular form of construction illustrated and described, but desire to avail ourselves of all modifications that may fall within the scope of the appended claims.

Having thus described our invention, what we claim and desire to secure by Letters Patent is:

1. In a mixing device, a drum arranged on a fixed inclined axis and having a reduced open end above the closed end thereof, said drum being adapted to be selectively rotated in both directions, a helical blade extending between said ends around the inner face of the drum for at least 360°, the end of the blade adjacent the open end of the drum being progressively reduced in width toward said open end to reduce obstruction to material entering into the drum while the same is rotated in one direction, said blade, including its reduced end, being adapted, upon rotation of the drum in the other direction, to discharge material from the open end, and at least one intermediate helical blade of lesser length than the mentioned helical blade disposed in the reduced end of the drum and also being progressively reduced in width toward said open end to catch material spilling from the first-mentioned blade to discharge the same during rotation in one direction of the drum and to draw said material into the drum during rotation in the other direction of the drum, the sum of the widths of the reduced ends of all of the blades being at least equal to the width of the widest portion of the first-mentioned helical blade.

2. In a mixing device, a drum arranged on a fixed inclined axis and having a reduced open end above the closed end thereof, said drum being adapted to be selectively rotated in both directions, a helical blade extending between said ends around the inner face of the drum for at least 360°, said blade being of substantial width from the closed end of the drum to a point nearer to but spaced from the open end thereof, the end of the helical blade extending from said point to the open end of the drum being progressively reduced in width toward said open end to reduce obstruction to material entering into the drum while the same is rotating in one direction, said reduced end of the blade, thereby having a smaller capacity to convey material to the drum opening than has the wider portion thereof when the drum is rotating in the opposite direction, and one helical blade section having a length approximating that of the progressively reduced end portion of the helical blade and positioned in the drum similarly to the position of said reduced portion, said helical blade section being progressively reduced in width similarly to said reduced end portion of the helical blade, the sum of the widths of the reduced ends of both the blade section and the reduced end portion of the blade being at least equal to the width of that portion of the latter blade that is inward of the mentioned point of the drum, whereby material conveyed by said inward portion toward the reduced end portion thereof, upon dislodgement from said reduced portion, is caught by the blade section, and whereby both said reduced ends effect discharge of material in amounts substantially equal to that conveyed by the inward portion of the helical blade.

3. In a mixing device, a drum arranged on a fixed inclined axis and having a reduced open end above the closed end thereof, said drum being adapted to be selectively rotated in both directions, a helical blade extending between said ends around the inner face of the drum for at least 360°, said blade being of substantial width from the closed end of the drum to a point nearer to but spaced from the open end thereof, the end of the helical blade extending from said point to the open end of the drum being progressively reduced in width toward said open end to reduce obstruction to material entering into the drum while the same is rotating in one direction, said reduced end of the blade, thereby, having a smaller capacity to convey material to the drum opening than has the wider portion thereof when the drum is rotating in the opposite direction, and two helical blade sections in the drum each having a length approximating that of the progressively reduced end portion of the helical blade and uniformly spaced from each other and from said reduced end portion, each helical blade section being progressively reduced in width similarly to said reduced end portion of the helical blade, the sum of the widths of the reduced ends of both blade sections and of the reduced end portion of the blade being at least equal to the width of that portion of the latter blade that is inward of the mentioned point of the drum, whereby material conveyed by said inward portion toward the reduced end portion thereof, upon dislodgement from said reduced portion, is caught by one or both of the blade sections, and whereby said three reduced ends effect discharge of material in amounts substantially equal to that conveyed by the inward portion of the helical blade.

*4. In a mixing device, a drum arranged on a fixed inclined axis having a reduced open end above the closed end thereof, said drum being adapted to be selectively rotated in both directions, a helical blade extending between the ends around the inner face of the drum for at least 360°, a portion substantially less than the full length of the blade adjacent the open end of the drum being progressively reduced in width toward said open end to reduce obstruction to material entering into the drum while the same is rotated in one direction, said blade including its reduced portion being adapted upon rotation of the drum in the other direction to discharge material from the open end, and at least one intermediate helical blade of length substantially equal to said reduced portion disposed in the reduced end of the drum and also being progressively reduced in width toward said open end to catch material falling from the reduced portion of the first mentioned blade and being of substantial width at the open end of said drum to discharge said spilled material during rotation in one direction of the drum and draw material into the drum during rotation in the other direction of the drum.*

*5. In a mixing device, a drum arranged on a fixed inclined axis having a reduced open end above the closed end thereof, said drum being adapted to be selectively rotated in both directions, a helical blade extending between said ends around the inner face of the drum for at least 360°, the end of the blade adjacent the open end of the drum being progressively reduced in width toward said open end to reduce obstruction to material entering into the drum while the same is rotated in one direction, said blade including its reduced end being adapted, upon rotation of the drum in the other direction, to discharge material from the open end, and at least one intermediate helical blade of lesser length than the mentioned helical blade disposed in the reduced end of the drum and also being progressively reduced in width toward said open end to catch material spilling from the first mentioned blade to discharge the same during rotation in one direction of the drum and to draw certain material into the drum during rotation in the other direction of the drum, the sum of the widths of the reduced ends of all the blades being a substantial proportion of the width at the widest portion of the first mentioned helical blade.*

*6. In a mixing device, the combination of: a drum having a cylindrical section closed at one end and a frusto-conical section joined to said cylindrical section and open at the reduced end thereof; mounting means for said drum including a fixed axial bearing member rotatably engaged with said closed end and a pair of rollers peripherally engaged with said drum intermediate the ends thereof, said bearing and rollers being relatively fixed with respect to a horizonal plane to rotatably support said drum on a fixed inclined axis; a first helical blade secured to the interior of said drum and extending substantially the full length thereof, the angular disposition of said blade with respect to said drum being such as to screw-feed material upwardlly out of said drum when the same is rotated in a given direction, said blade having a conveyor section adjacent said opening, said conveyor section being of such width as to leave an unobstructed axial passageway at said opening through which material may be projected into said drum to charge the same, and said blade having a mixing section positioned in said cylindrical drum section, said mixing blade section being of materially increased width such as would block said passageway if said blade were full width throughout its length; and a supplemental helical blade in said frusto-conical drum section, circumferentially spaced from said conveyor section of said first blade, twisted in the same direction as said conveyor section, and of such width as to materially augment the conveyor action of said first blade when said drum is rotated in said direction, but not sufficiently wide to materially encroach into said axial passageway.*

*7. In a mixing device: a drum mounted for rotation in either direction on a fixed, inclined axis and having a lower closed end and an upper reduced open end; first helical blade means secured to the interior of said drum extending substantially the entire length and covering 360 degrees of the interior circumference thereof, the angular disposition of said blade means with respect to said drum being such as to screw-feed material upwardly out of said drum when the same is rotated in a first direction, and said blade means including a relatively wide mixing blade adjacent the lower end of said drum, and a conveyor blade joined with said mixing blade adjacent said open end, said conveyor blade being substantially reduced in width at said opening whereby to leave an unobstructed axial passageway through which material may be projected into said drum to charge the same during rotation of said drum in a second direction such that material is urged inwardly by the action of said blade means; and at least one supplemental helical blade of substantially less length than said drum, mounted in said drum adjacent said opening and circumferentially spaced from said conveyor blade to augment said screw-feed action in discharging material from said drum when the same is rotated in said first direction.*

CARL L. WILLARD.
J JACK WILLARD.

REFERENCES CITED

The following references are of record in the file of this patent or the original patent:

UNITED STATES PATENTS

| Number | Name | Date |
|---|---|---|
| 870,797 | Ransome | Nov. 12, 1907 |
| 982,020 | Ransome | Jan. 17, 1911 |
| 1,583,863 | Temperly | May 11, 1926 |
| 1,781,823 | Robbins | Nov. 18, 1930 |
| 2,285,685 | Shafer | June 9, 1942 |
| 2,338,820 | Peters | Jan. 11, 1944 |